(12) United States Patent
Gordon

(10) Patent No.: US 12,442,746 B2
(45) Date of Patent: Oct. 14, 2025

(54) FOREIGN METALLIC PARTICLE DETECTOR SYSTEMS AND METHODS OF DETECTING FOREIGN METALLIC PARTICLES

(71) Applicant: Toyota Research Institute, Inc., Los Altos, CA (US)

(72) Inventor: Matthew P. Gordon, Berkeley, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 233 days.

(21) Appl. No.: 18/115,395

(22) Filed: Feb. 28, 2023

(65) Prior Publication Data

US 2024/0288352 A1   Aug. 29, 2024

(51) Int. Cl.
*G01N 15/0205* (2024.01)
*G01N 21/88* (2006.01)
(Continued)

(52) U.S. Cl.
CPC ......... *G01N 15/0205* (2013.01); *G01N 21/88* (2013.01); *G01N 21/89* (2013.01);
(Continued)

(58) Field of Classification Search
CPC ....... G01N 15/0205; G01N 2015/0061; G01N 21/94; G01N 21/945; G01N 21/95;
(Continued)

(56) References Cited

U.S. PATENT DOCUMENTS 5,715,052 A * 2/1998 Fujino .................... G01N 21/94
356/622
7,233,841 B2   6/2007 Sadighi et al.
(Continued)

FOREIGN PATENT DOCUMENTS

JP   2015185278 A   10/2015

OTHER PUBLICATIONS

Kurfer et al., "Production of large-area lithium-ion cells—Preconditioning, cell stacking and quality assurance," CIRP Annals—Manufacturing Technology, vol. 61, issue 1, 2012, pp. 1-4.
(Continued)

*Primary Examiner* — Kara E. Geisel
*Assistant Examiner* — Jonathon Cook
(74) *Attorney, Agent, or Firm* — Christopher G. Darrow; Darrow Mustafa PC

(57) ABSTRACT

A metallic particle detector system includes a particle detection unit with a detector configured to detect, and provide signals as function of, light reflected from a surface of an active material layer on a charge collector backing layer moving on a roll-to-roll coated electrode manufacturing line. The particle detection unit also includes a controller configured to receive the signals from the detector and determine, in-situ and as a function of the signals from the detector, a foreign metallic particle on the active material layer. The controller is also configured to determine a position of the foreign metallic particle on the charge collector backing layer moving on the roll-to-roll coated electrode manufacturing line.

19 Claims, 7 Drawing Sheets

(51) Int. Cl.
 *G01N 21/89* (2006.01)
 *G01N 21/94* (2006.01)
 *H01M 4/1395* (2010.01)
 *G01N 15/00* (2006.01)

(52) U.S. Cl.
 CPC .......... *G01N 21/94* (2013.01); *H01M 4/1395* (2013.01); *G01N 2015/0061* (2013.01); *G01N 2021/8909* (2013.01)

(58) Field of Classification Search
 CPC ............... G01N 21/8803; G01N 21/89; G01N 21/8901; G01N 2021/8845; G01N 2021/889; G01N 2021/8893; G01N 2021/8909; H01M 4/1395
 See application file for complete search history.

(56) References Cited

U.S. PATENT DOCUMENTS

| | | | |
|---|---|---|---|
| 10,128,547 B2 | 11/2018 | Fujimaki et al. | |
| 12,241,843 B2 * | 3/2025 | Choi | H01M 10/0404 |
| 2010/0074405 A1 * | 3/2010 | Saito | G01N 23/223 356/237.1 |
| 2012/0074047 A1 * | 3/2012 | Deefholts | G01N 33/025 209/587 |
| 2013/0320216 A1 * | 12/2013 | Aiko | G01N 21/88 250/353 |
| 2018/0365822 A1 * | 12/2018 | Nipe | G06T 7/0008 |
| 2020/0309599 A1 * | 10/2020 | Aiso | H04N 23/11 |
| 2021/0265673 A1 * | 8/2021 | Jordan | H01M 50/105 |
| 2023/0251752 A1 * | 8/2023 | Su | G01N 21/89 715/764 |
| 2023/0350308 A1 * | 11/2023 | Pawlowski | G03F 7/70908 |

OTHER PUBLICATIONS

Frommknecht et al. "Automated inline visual inspection and 3D measuring in electrode manufacturing", Jun. 21, 2019, 12 pages.
Mabe et al. "Photonic Low Cost Micro-Sensor for in-Line Wear Particle Detection in Flowing Lube Oils", Mar. 14, 2017, 28 pages.
Kapeller et al. "Photometric stereo-based high-speed inline battery electrode inspection", Jun. 2021, 10 pages.
Just et al., "Infrared particle detection for battery electrode foils," Infrared Phys Techn 61, 2013, pp. 254-258.

* cited by examiner

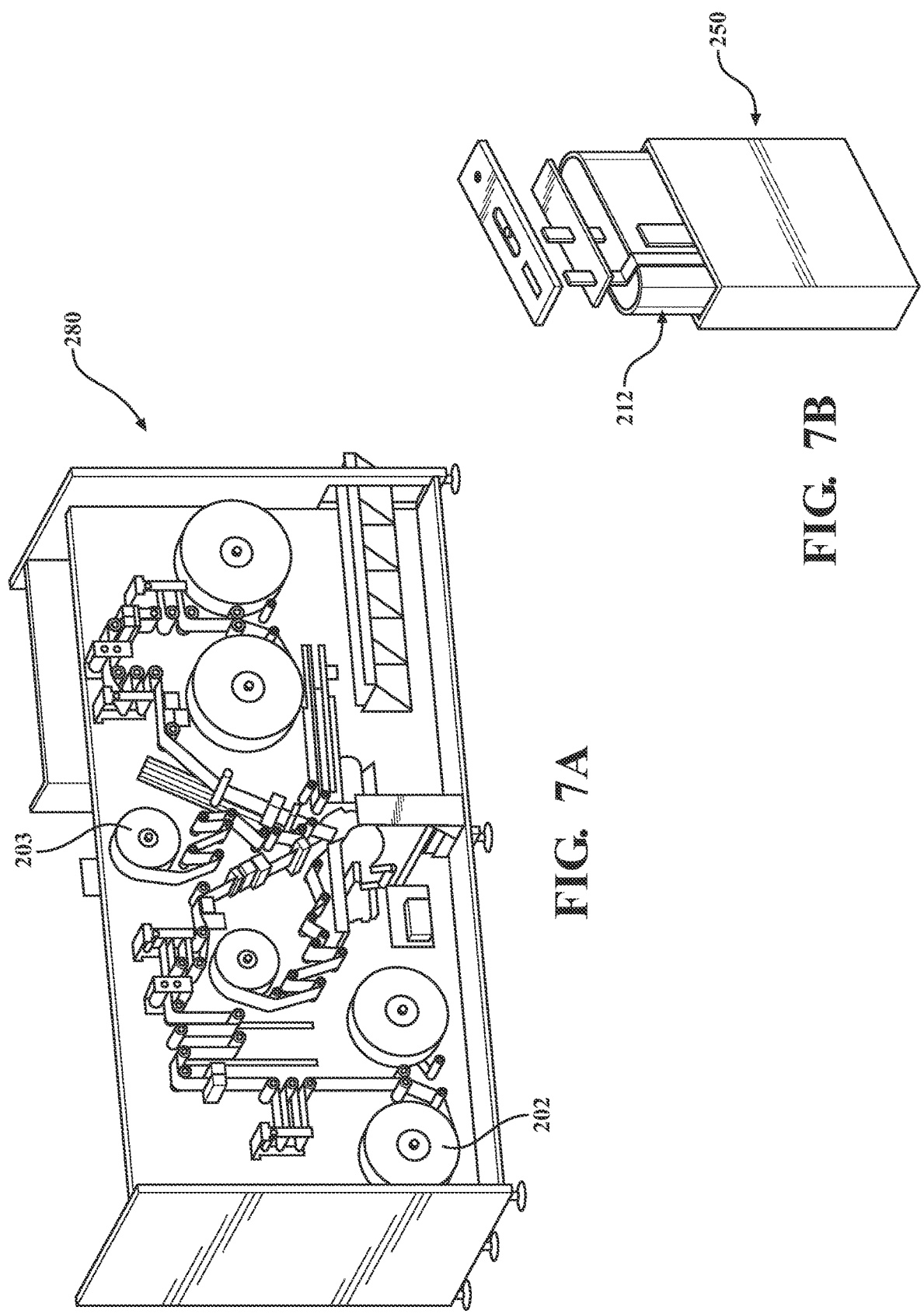

FOREIGN METALLIC PARTICLE DETECTOR SYSTEMS AND METHODS OF DETECTING FOREIGN METALLIC PARTICLES

TECHNICAL FIELD

The present disclosure generally relates to metallic particle detection, and particularly to foreign metallic particle detection during roll-to-roll coated electrode manufacturing.

BACKGROUND

Typical lithium-ion battery production lines include calendaring active material onto a strip of metal foil to form anode and cathode electrode strips that may or may not be wound into coils for storage and transport. Also, an electrode strip is fed into a stacking or winding machine that cuts plate electrodes from the electrode strip, and inserts separator layers between the plate electrodes such that battery cells can be assembled and inserted into battery containers which are eventually sealed.

The manufacture of plate electrodes and lithium-ion batteries in this manner is an energy and time efficient process compared to batch processes. However, such electrode manufacturing processes can result in foreign metallic particle contamination of the active material and thus the battery cells. That is, foreign (i.e., unwanted) metallic particles resulting from metal cutting, welding, and/or friction between machine parts can be present on and/or in an active material layer of a plate electrode and the foreign metallic particles can reduce the performance and operation of a battery cell.

The present disclosure addresses the issue of foreign metallic particle contamination in battery cells, and other issues related to foreign metallic particle contamination.

SUMMARY

In one form of the present disclosure, a metallic particle detector system includes a particle detection unit with a detector configured to detect, and provide signals as function of, light reflected from a surface of an active material layer on an charge collector backing layer moving on a roll-to-roll coated electrode manufacturing line. The particle detection unit also includes a controller configured to receive the signals from the detector and determine or detect, in-situ and as a function of the signals from the detector, a foreign metallic particle in or on the active material layer. The controller is also configured to determine a position of the foreign metallic particle on the charge collector backing layer moving on the roll-to-roll coated electrode manufacturing line.

In another form of the present disclosure, a metallic particle detector system includes a plurality particle detection units that individually include a detector selected from the group consisting of a line scanner and sCMOS camera with a rolling shutter. The detector is configured to detect, and provide signals as function of, light reflected from a surface of an active material layer on an charge collector backing layer moving between a section and a subsequent section on a roll-to-roll coated electrode manufacturing line for the manufacture of battery plate electrodes or fuel cell plate electrodes. The metallic particle detector system also includes a controller configured to receive the signals from the detector and determine, in-situ and as a function of the signals from the detector, a foreign metallic particle in or on the active material layer, and a position of the foreign metallic particle on the charge collector backing layer moving between the section and the subsequent section on the roll-to-roll coated electrode manufacturing line.

In still another form of the present disclosure, an electrode manufacturing line includes a particle detection system with a detector selected from the group consisting of a line scanner and sCMOS camera with a rolling shutter. The detector is configured to detect, and provide signals as function of, light reflected from a surface of the active material layer of roll-to-roll coated electrode moving between a section or station and a subsequent section or station on the electrode manufacturing line. The particle detection system also includes a controller configured to receive the signals from the detector and determine, in-situ and as a function of the signals from the detector, a foreign metallic particle in or on the active material layer, and a position of the foreign metallic particle on the roll-to-roll coated electrode moving between the section and the subsequent section on the roll-to-roll coated electrode manufacturing line.

These and other features of the fuel cells will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein:

FIG. 7A illustrates an electrode winding machine for manufacture of a coiled electrode battery cell according to the teachings of the present disclosure;

FIG. 7B illustrates a coiled battery cell according to the teachings of the present disclosure;

It should be noted that the figures set forth herein are intended to exemplify the general characteristics of the methods, algorithms, and devices among those of the present technology, for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides a metallic particle detection system for detecting foreign metallic particles (e.g., particles of silver, gold, copper, and/or steel, among others) on or at least partially in an active material layer of a plate electrode. The metallic particle detection system provides real-time (i.e., in-situ) detection of foreign metallic particles with average diameters less than about 1000 μm during continuous production of an electrode strip such that contaminated portions of the electrode strip can be identified and removed before such portions are assembled into a battery cell unit or a fuel cell unit. The metallic particle detection system can be used during and/or after a startup period of a new and/or existing plate electrode production line such that enhanced (e.g., faster or quicker) identification of a source or sources of foreign metallic particles is provided. For example, one or more metallic particle detection systems can be positioned at different points or locations along a plate electrode production line and used to assist operators in successively narrowing down a likely source of metallic particle contamination by observing which processes or manufacturing steps along the plate electrode production line introduce foreign metallic particles.

In the alternative, or in addition to, portions of an electrode strip contaminated with one or foreign metallic particles can be identified and removed before such portions are assembled into a battery cell unit or a fuel cell unit. For example, in some variations an integrated wireless (e.g., Wi-Fi) or wired network transmits timestamps of detected foreign metallic particles to a controller (e.g., a manufacturing execution system (MES)), which in turn transmits a removal signal to a programmable logic controller (PLC) that is triggered to automatically remove a contaminated plate electrode and/or a contaminated battery cell or fuel cell from a production line. Accordingly, the metallic particle detection system according to the teachings of the present disclosure provides for reduction in downstream labor, materials, and time.

Figure 1:
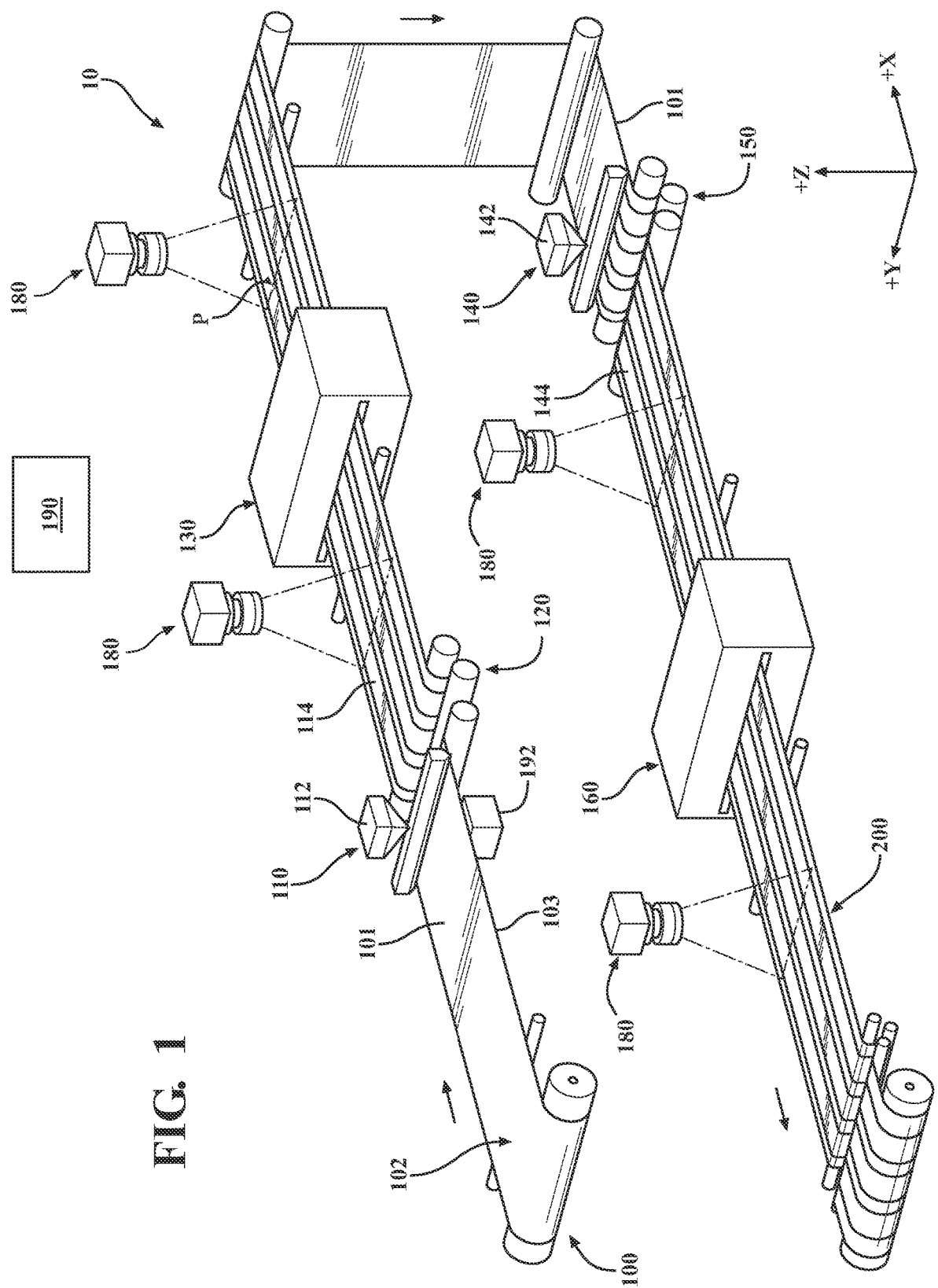
FIG. 1 illustrates a perspective view of an electrode strip production line according to the teachings of the present disclosure.

Referring now to FIG. 1, a perspective view of a plate electrode production line 10 (hereafter also referred to simply as "electrode production line 10") for manufacturing an electrode strip 200 according to the teachings of the present disclosure is shown. The electrode production line 10 includes a source 100 (e.g., a roll) of an charge collector backing layer 102 and an active material source 110 (e.g., a "first active material source 110") that provides an active material 112 (e.g., a "first active material 112") onto a first side 101 of the charge collector backing layer 102. In some variations, another active material source 140 (e.g., a "second active material source 140") that provides another active material 142 (e.g., a "second active material 142") onto a second side 103 of the electrode backing layer 102 is included. Non-limiting examples of the charge collector backing layer include foil or sheet of copper, aluminum, and alloys thereof.

A set of calendaring rollers 120 and optionally a dryer 130 are included downstream from the first active material source 110, and another set of calendaring rollers 150 and optionally another dryer 160 can be included downstream from the second active material source 142. It should be understood that FIG. 1 represents but one illustrative example of an electrode production line and that additional calendaring rollers, guide rollers, materials sources, and dryers, among other components, can be included in an electrode production line that falls within the scope of the present disclosure.

In some variations, the first active material 112 is the same as the second active material 142 (i.e., has the same chemical composition, particle size(s), etc.), while in other variations the first active material 112 is not the same the second active material 142. Also, in at least one variation the electrode production line 10 is a wet electrode production line such that the first dryer 130 and/or the second dryer 160 are included, while in at least one other variation, the electrode production line 10 is a dry electrode production line such that a free standing electrode film is calendared onto the charge collector backing layer 102 and the first dryer 130 and/or the second dryer 160 are not included. It should be understood that the first active material source 110 is configured to provide or deposit the first active material 112 onto the first side 101 of the charge collector backing layer 102 and form one or more first active material layers 114 thereon and the second active material source 140 is configured to provide or deposit the second active material 142 onto the second side 103 of the charge collector backing layer 102 and form one or more second active material layers 144 thereon. And non-limiting examples of the first active material 112 and/or the second active material 142 include materials containing carbon such that the color of the active material is a dark color. As used herein, the term "dark color" refers to a background that has less than 20% of the reflectance of a foreground object (e.g., a foreign metallic particle) being measured.

Still referring to FIG. 1, the electrode production line 10 includes one or more foreign metallic particle detectors 180. For example, and for illustrative purposes only, a foreign metallic particle detector 180 can be positioned upstream of the first dryer 130, downstream of the first dryer 130, upstream of the second dryer 160, and/or downstream of the second dryer 160. In some variations, a foreign metallic particle detector 180 is moved from one position (e.g., upstream the first dryer 130 and/or the second dryer 160) to another position (e.g., downstream the first dryer 130 and/or the second dryer 160) in order to detect foreign metallic particles on or at least partially within the first active material layer 114 and/or the second active material layer 144 during manufacture of the electrode strip 200. Stated differently, a single foreign metallic particle detector 180 can be releasably attached (e.g., magnetically or mechanically attached to a structural component of the electrode production line 10) at different locations along the electrode production line 10 such that a source of foreign metallic particles can be determined without use or employment of a multi-detector setup or system.

During operation of the electrode production line 10, the first active material source 110 applies the first active material 112 to the first side 101 of the charge collector backing layer 102 to form one or more first active material layers 114 thereon and the one or more first active material layers 114 (i.e., the one or more first active material layers 114 on the charge collector backing layer 102) pass through the first dryer 130 such that solvent within the one or more first active material layers 114 is removed therefrom. It should be understood that the first dryer 130 can be a source or foreign metallic particles, and accordingly, in some variations a foreign metallic particle detector 180 scans the one or more active material layers 114 before entering the first dryer 130 and another foreign metallic particle detector 180 scans the one or more active material layers 114 after passing through the first dryer 130 such that foreign metallic particles can be detected upstream and downstream of the dryer 130 as described in greater detail below.

In variations where the electrode production line includes the second active material source 140, the second active material 142 is applied to the second side 103 of the charge collector backing layer 102 such that one or more second active material layers 144 are formed thereon. Also, the one or more second active material layers 144 pass through the second dryer 160 such that solvent within the one or more second active material layers 144 is removed therefrom. And similar to the first dryer 130, the second dryer 160 can be a source or foreign metallic particles, and accordingly, in some variations a foreign metallic particle detectors 180 scans the one or more active material layers 144 before entering the second dryer 160 and another foreign metallic particle detector 180 scans the one or more active material layers 144 after passing through the second dryer 160. And while FIG. 1 illustrates foreign metallic particle detectors 180 upstream and downstream of the first and second dryers 130, 160, it should be understood that one or more foreign metallic particle detectors 180 can be positioned upstream and/or downstream other components or stations along the electrode production line 10 including but not limited to coating components/stations, pressing components/stations, slitting components/stations, notching components/stations, stacking components/stations, welding components/stations, assembly components/stations, and sealing components/stations, among others.

Not being bound by theory, the presence of a foreign metallic particle on or partially within the one or more active material layers 114 and/or second active material layers 144 reflects more incident light than the surrounding active material 112, 142. For example, metallic particles with an average size or diameter greater than about 10 micrometers (μm) strongly reflect light under desired illumination conditions. Accordingly, the difference between the low reflection of light (e.g., less than 10%) by the active material 112, 142 and the high reflection of light (e.g., greater than 50%) by a metallic particle is imaged by a foreign metallic particle detector 180 such that the presence of a foreign metallic particle is detected.

As used herein, the term "light" refers to ultraviolet (UV) light, visible light, and/or infrared (IR) light. For example, in some variations, foreign metallic particles are detected via illumination of the first active material layer 114 and/or the second active material layer 144 with UV light, while in other variations foreign metallic particles are detected via illumination of the first active material layer 114 and/or the second active material layer 144 with visible light. In at least one variation, foreign metallic particles are detected via illumination of the first active material layer 114 and/or the second active material layer 144 with IR light. And in some variations, foreign metallic particles are detected via illumination of the first active material layer 114 and/or the second active material layer 144 with a combination of UV, visible and/or IR light.

Still referring to FIG. 1, in some variations, the one or more foreign metallic particle detectors 180 are in communication (e.g., wired and/or wireless communication) with a controller 190 such that a timestamp of a detected foreign metallic particle 'P' in combination with an encoder 192 in-situ identifies and stores a physical position (location) of the detected foreign metallic particle P on the electrode strip 200. And in such variations a section of the electrode strip 200 containing or having the foreign metallic particle P can be identified and removed before the section is placed within a battery cell or a fuel cell.

In some variations, one or more of the foreign metallic particle detectors 180 is a line scan camera 180. For example, a foreign metallic particle detector 180 can have a line scan sensor with between 512 to 12,000 (12 k) pixels (e.g., 512, 1 k, 2 k, 4 k, 8 k, 12 k, among others) that may or may not be read out on multiple channels (e.g., dual channels, quad channels, eight channels, among others). In addition, the pixels can have a size of about 5 μm×5 μm, 7 μm×7 μm, 10 μm×10 μm, 14 μm×14 μm, among others. The magnification of the line scan camera can be adjusted such that reflection from a foreign metallic particle P having an average diameter less than a predetermined size (e.g., <100 μm) is captured within a single pixel (e.g., a 20:1 magnification to image a 100 μm particle within a 5 μm×5 μm pixel). And in such variations, an image of the foreign metallic particle P contributes most if not all of the signal to a single pixel and thereby maximizes the relative contribution of the foreign metallic particle P and the substrate (i.e., surrounding active material layer 114) to an image of the foreign metallic particle P.

In other variations, one or more of the foreign metallic particle detectors 180 is an area scan camera 180. For example, the area scan camera 180 can be a sCMOS camera with a rolling shutter. In addition, the magnification of the sCMOS camera can be adjusted such that reflection from a foreign metallic particle P having an average diameter less than a predetermined size (e.g., <100 μm) is captured within a minimum of a single pixel (e.g., 3 to 5 pixels) of the SCMOS camera (e.g., a 20:1 magnification to image a 100 μm particle within a 5 μm×5 μm pixel). And in such variations, an image of the foreign metallic particle P contributes most if not all of the signal to a single pixel and thereby maximizes the relative contribution of the foreign metallic particle P and the substrate (i.e., surrounding active material layer 114) to an image of the foreign metallic particle P.

Figure 2:
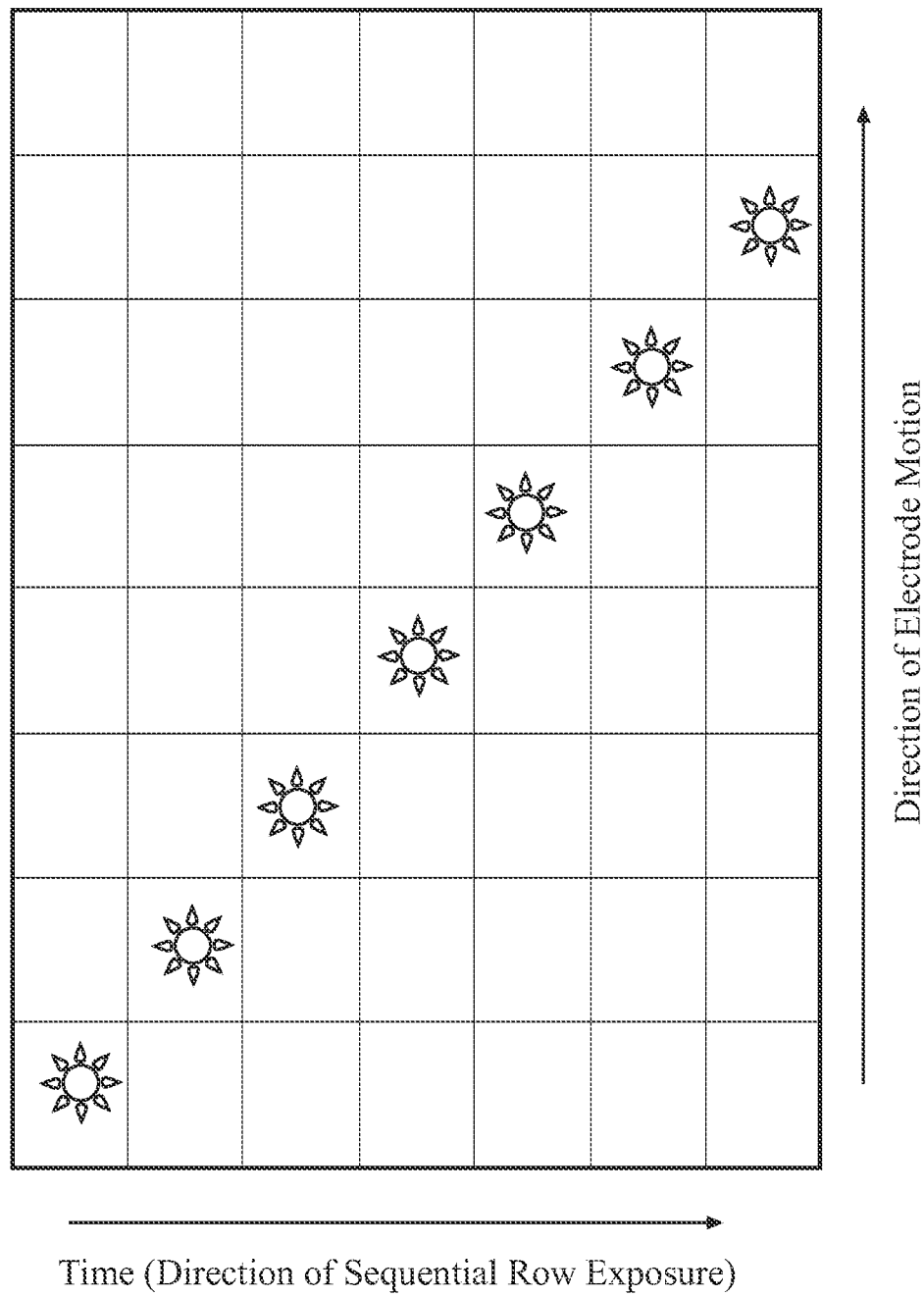
FIG. 2 is a kymograph showing time (direction of sequential row exposures) versus direction of an electrode strip motion for the exposure of a foreign metallic particle detected on an active material layer and as imaged with a sCMOS camera with a rolling shutter according to the teachings of the present disclosure.

The rolling shutter exposes each camera row in sequence such that a sequence of individual scans can be provided. In addition readout times as fast as 10 microseconds (μsec) per row can be provided and such readout times allow for 'N' independent measurements of a single metal particle such that confidence of a single particle detection is enhanced. For example, and with reference to FIG. 2, a kymograph of a single metallic particle can be provided such that an image of the single metallic particle appears as a line, instead of a single point, when rows of the rolling shutter are assembled. Accordingly, use of such an area scan camera 180 provides enhanced detection of foreign metallic particles P with lower signal to noise ratios.

In some variations, the shutter time and magnification can be set or adjusted such that each exposure results in a particle moving about 1 one row (i.e., about 50 μsec) and the benefits of maximal signal to noise ratio exposure is obtained. Also, about 1000 measurements per particle can be obtained. And assuming 1 watt of illumination on a 10 cm×10 cm patch of electrode, a single 100 μm particle induces about 200,000 photons per pixel in 50 μsec such that with an assumed 50% quantum efficiency, signals for detection of foreign metallic particles using the area scan camera 180 provide sufficient imaging thereof.

Figure 3:
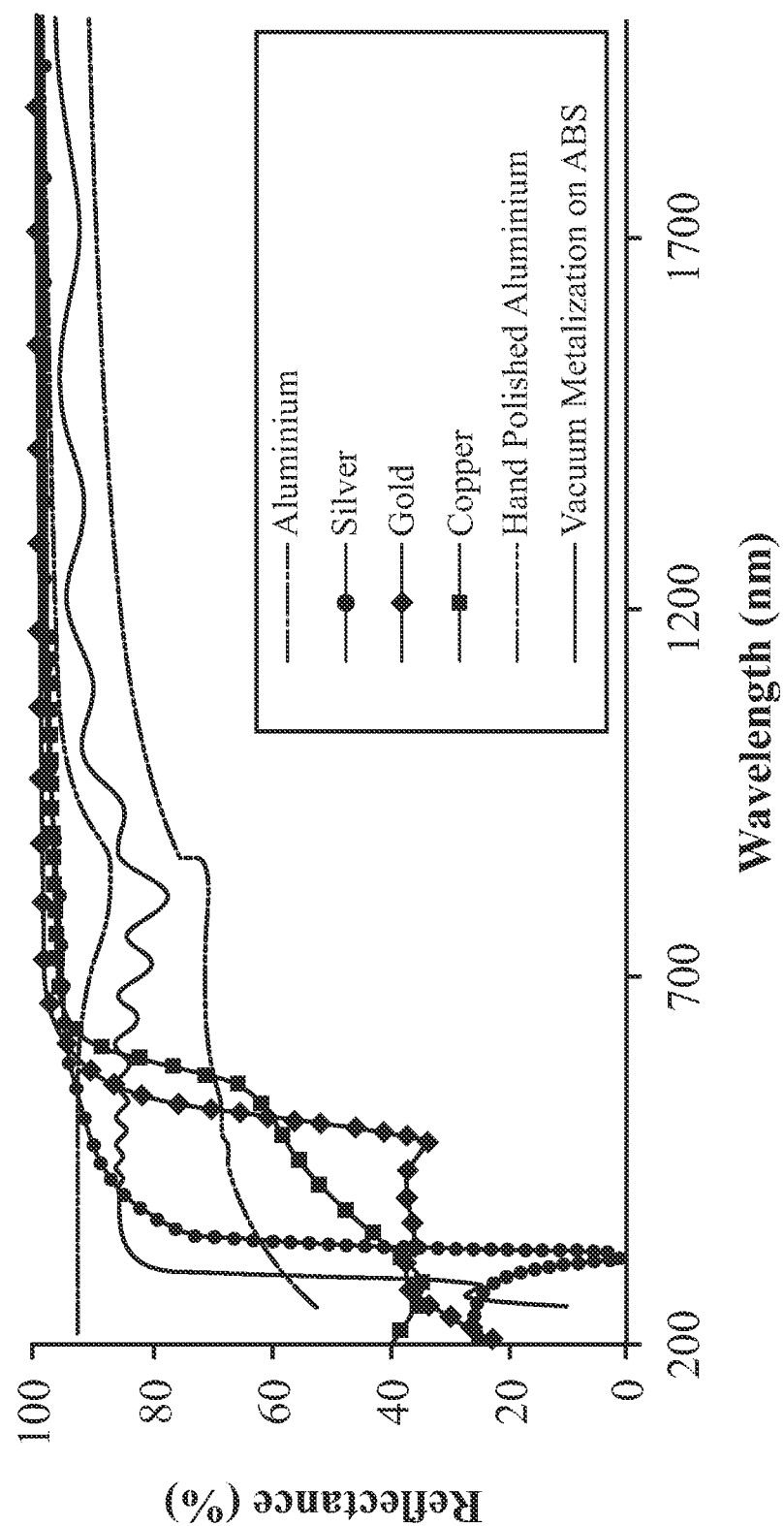
FIG. 3 is a plot of reflectance (%) versus light wavelength reflected from different metals.

Referring now to FIG. 3, in some variations the one or more foreign metallic particle detectors 180 and/or the controller 190 provide a chemical characterization of a foreign metallic particle. For example, metals such as aluminum, silver, gold, and copper, among others, exhibit a signature reflectance versus light wavelength profile. Accordingly, detecting and measuring the percentage (%) of light reflected from a metallic particle as a function of incident light wavelength is used to chemically characterize and detect foreign metallic particles. For example, and assuming an average 10% background noise from an active material layer, an aluminum particle would exhibit a signal to noise ratio between about 9.0 and about 9.5 for incident light having wavelengths between about 200 nm and about 500 nm, whereas a copper particle would exhibit a signal to noise ratio between about 3.0 and about 4.0 for incident light having wavelengths between about 200 nm and about 500 nm. Accordingly, the foreign metallic particle detector 180 and/or the controller 190 distinguishes between a foreign aluminum particle and a foreign copper particle (and other foreign metallic particles) using a lookup table of signal to noise ratios for different metallic particles. It should be understood that other techniques and components (e.g., dichroic filters) can be used to identify and chemically characterize foreign metallic particles according to the teachings of the present disclosure. For example, in some variations multi-band spectroscopy is used in which a dichroic filter splits light scattered from a foreign metallic particle into two or more channels, and a differential measurement of the light intensity in each channel to determine of a chemical characterization of a foreign metallic particle. In other variations, an optical spectrometer with a diffraction grating and a 2D sensor are used to provide hyperspectral imaging to determine a chemical characterization of a foreign metallic particle.

Figure 4A:
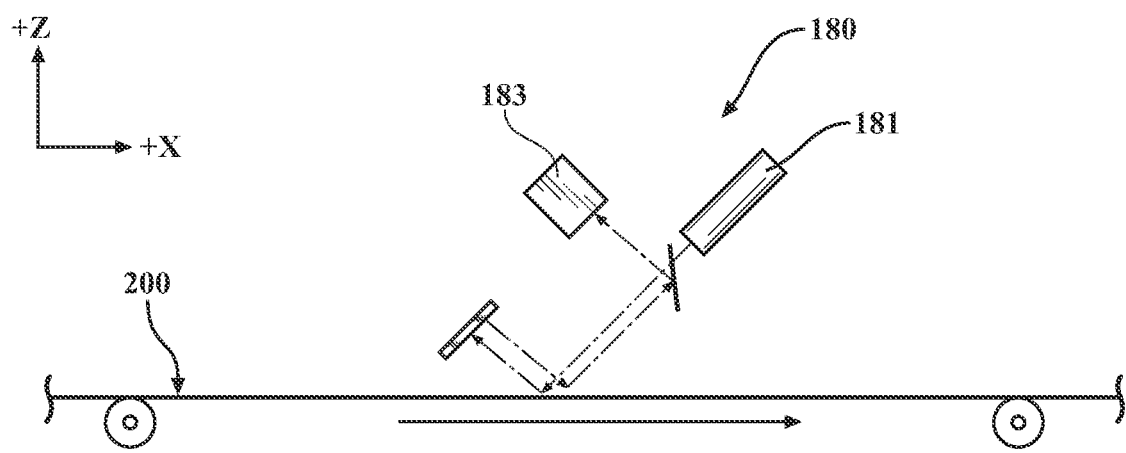
FIG. 4A illustrates a foreign metallic particle detector positioned and exposed to a surrounding environment according to the teachings of the present disclosure.
Figure 4B:
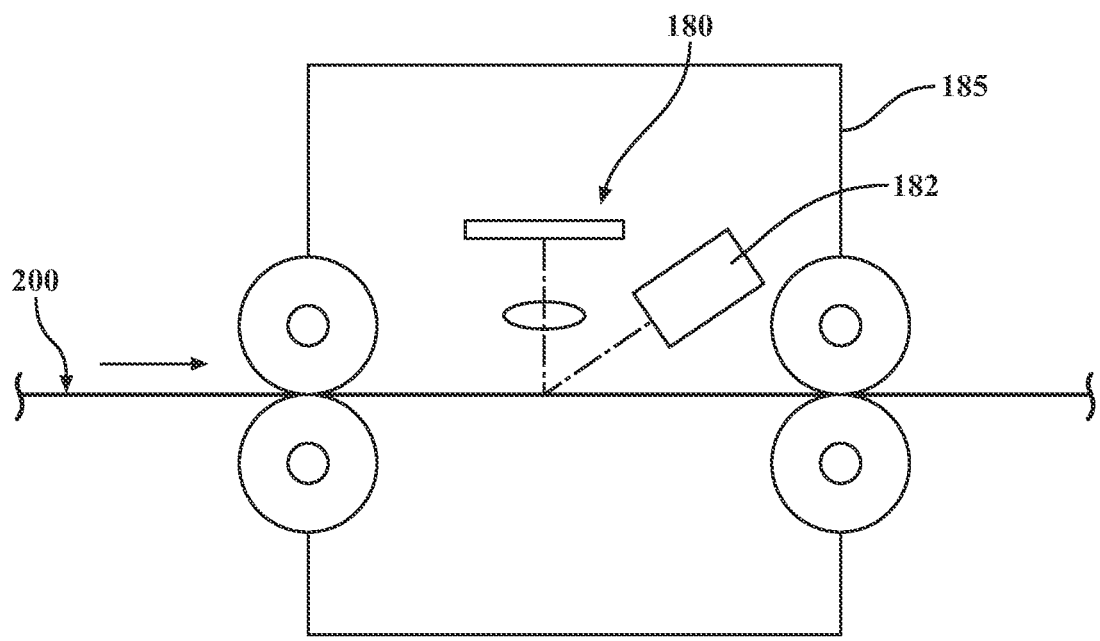
FIG. 4B illustrates a foreign metallic particle detector positioned within an enclosure according to the teachings of the present disclosure.

Referring to FIGS. 4A-4B, in some variations the one or more foreign metallic particle detectors 180 are exposed to a surrounding production line environment (i.e., not contained with an enclosure) as illustrated in FIG. 4A, while in other variations the one or more foreign metallic particle detectors 180 are positioned or contained with a light-tight enclosure 185 (also referred to herein simply as "enclosure") as illustrated in FIG. 4B. For example, and with reference to FIG. 4A, use of an UV or IR light source 181 for propagating UV or IR light onto the active material layer 114 results in ambient or factory light not being detected by or interfering with UV or IR light reflected from a foreign metallic particle and detected or image by a camera 132. Accordingly, protecting or shielding the foreign metallic particle detector 180 from "outside" light is not employed. In the alternative, the enclosure 185 (FIG. 4B) shields the one or more foreign metallic particle detectors 180 from ambient or factory light such that a UV or IR light is not required, a visible light source 182 (e.g., a broadband light source or a visible laser light source) can be used, and/or an increase in the signal to noise ratio of light reflected from foreign metallic particles illuminated within the enclosure 185 is provided. And while FIGS. 4A-4B show only one foreign metallic particle detector 180 exposed to a surrounding environment and only one foreign metallic particle detector 180 positioned within an enclosure, respectively, it should be understood that the electrode production line 10 can include one or more foreign metallic particle detectors 180 exposed to a surrounding environment (i.e., not within an enclosure) and one or more foreign metallic particle detectors 180 positioned or contained within the enclosure 185. In addition, in some variations one or more of the foreign metallic detectors 180 include more than one type of detector (e.g., a line scan camera and a multi-band spectroscopy system, a dark field camera/imager and a bright field camera/imager, among others) and/or more than one imaging modality (e.g., simultaneous bright field and dark field spectroscopy imaging).

Figure 6A:
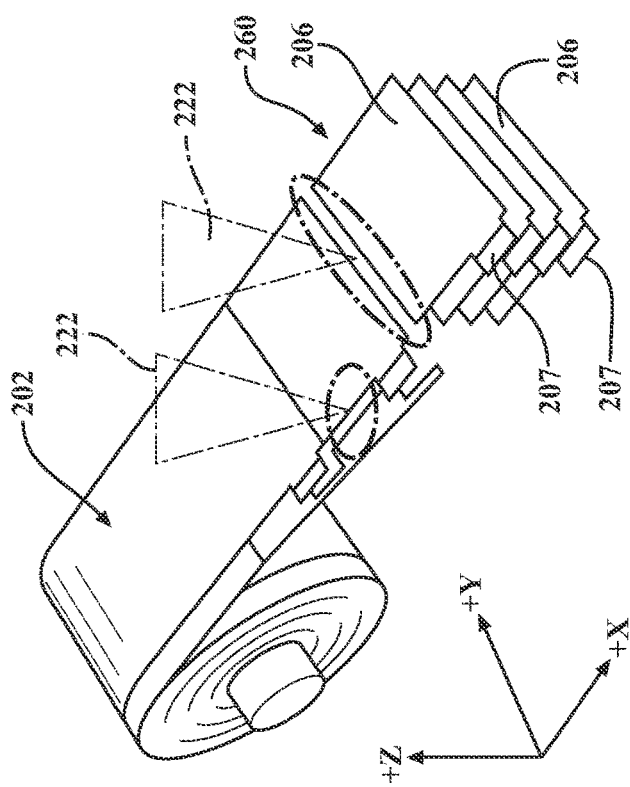
FIG. 6A illustrates a perspective view of a cutting station and a stacking station according to the teachings of the present disclosure.
Figure 5:
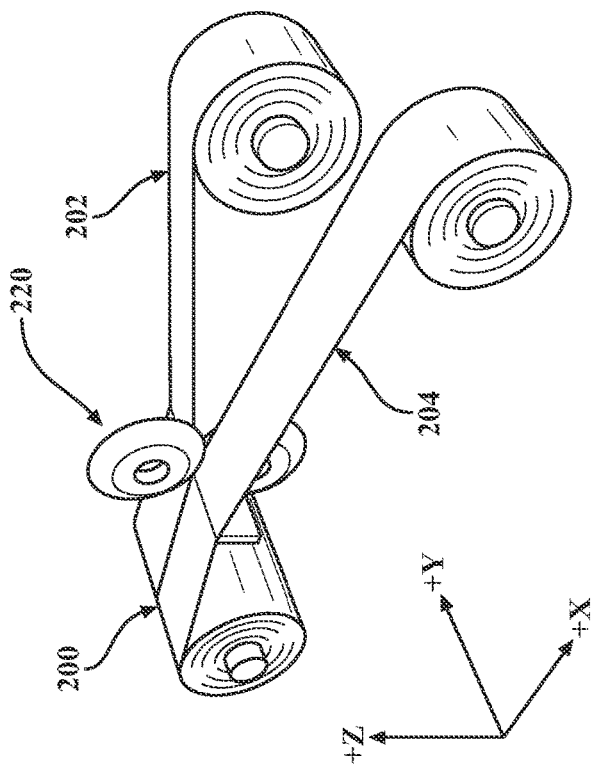
FIG. 5 illustrates a perspective view of a slitter station according to the teachings of the present disclosure.
Figure 6B:
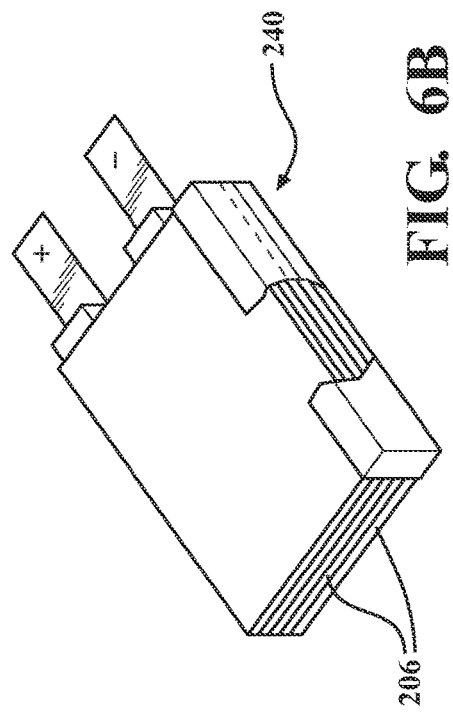
FIG. 6B illustrates a stacked battery cell according to the teachings of the present disclosure.

Referring now to FIG. 5, in some variations the electrode production line 10 includes a slitter 220 (e.g., a mechanical or laser slitter) that cuts the electrode strip 10 in a length direction such that at least two electrode strips 202, 204 are formed for further processing. Also, in at least one variation one or both of the electrode strips 202, 204 (referred to hereafter simply as "electrode strip 202") is cut into panels 206 with tabs 207 using one or more cutters 222 (e.g., a laser cutter) as illustrated in FIG. 6A and the panels 206 are assembled with separator layers (not shown) at a stacking station 260 to form battery cells 240 illustrated in FIG. 6B. It should be understood that the slitter 220 and/or the one or more cutters 222 can be a source of foreign metallic particles, and thus while not shown in FIGS. 5 and 6A, one or more foreign metallic particle detectors 180 can be positioned upstream and/or downstream of the slitter 220 and/or the one or more cutters 222.

Referring to FIGS. 7A-7B, in at least one variation an electrode winder 280 winds an electrode strip 202 (or 204) with a separator layer 203 to form coil electrode cells 212 (also known as "jelly rolls") for coil batteries 250. And while a foreign metallic particle detector 180 is not shown in FIG. 7A, it should be understood that one or more foreign metallic particle detectors 180 can be positioned along the processing route of the electrode strip 202 within the electrode winder 280 for detecting foreign metallic particles and a source of foreign metallic particles.

Figure 8:
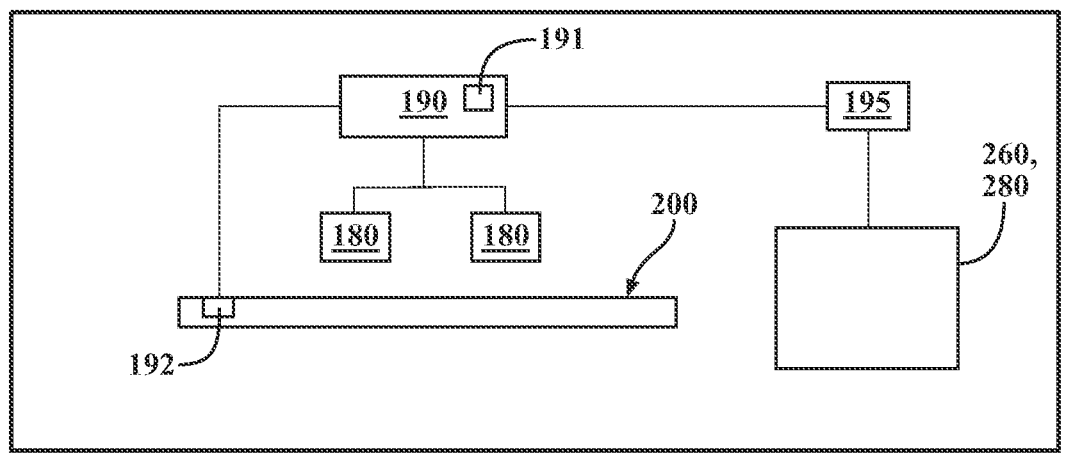
FIG. 8 is a block diagram of a foreign metallic detection system according to the teachings of the present disclosure.

Referring to FIG. 8, a block diagram for the electrode production line 10 is shown. The electrode production line 10 includes the one or more foreign metallic particle detectors 180 and the encoder 192 in communication with the controller 190 such that the presence of one or more foreign metallic particles P can be detected and its position or location on the electrode strip 200 determined and stored in a memory 191. In some variations, the controller 190 is configured to receive signals provided from the detector 180 and determine foreign metallic particles P with an average diameter greater than or equal to about 10 μm and less than or equal to 1500 μm, for example an average diameter between about 25 μm and 1000 μm, between about 25 μm and about 500 μm, or between about 25 μm and about 250 μm.

The electrode production line 10 can include the stacking station 260 and/or the electrode winder 280, and a programmable logic controller 195 in communication with the controller 190 can execute a command to remove one or more of the panels 206 or jelly rolls 208 that the controller 190 and/or the one or more foreign metallic particle detectors 180 has identified as containing one or more foreign metallic particles P. In the alternative, or in addition to, the programmable logic controller 195 can be communication with the controller 190 and can execute a command to remove an electrode cell 210, 212 that has been identified as containing one or more foreign metallic particles.

Figure 9:
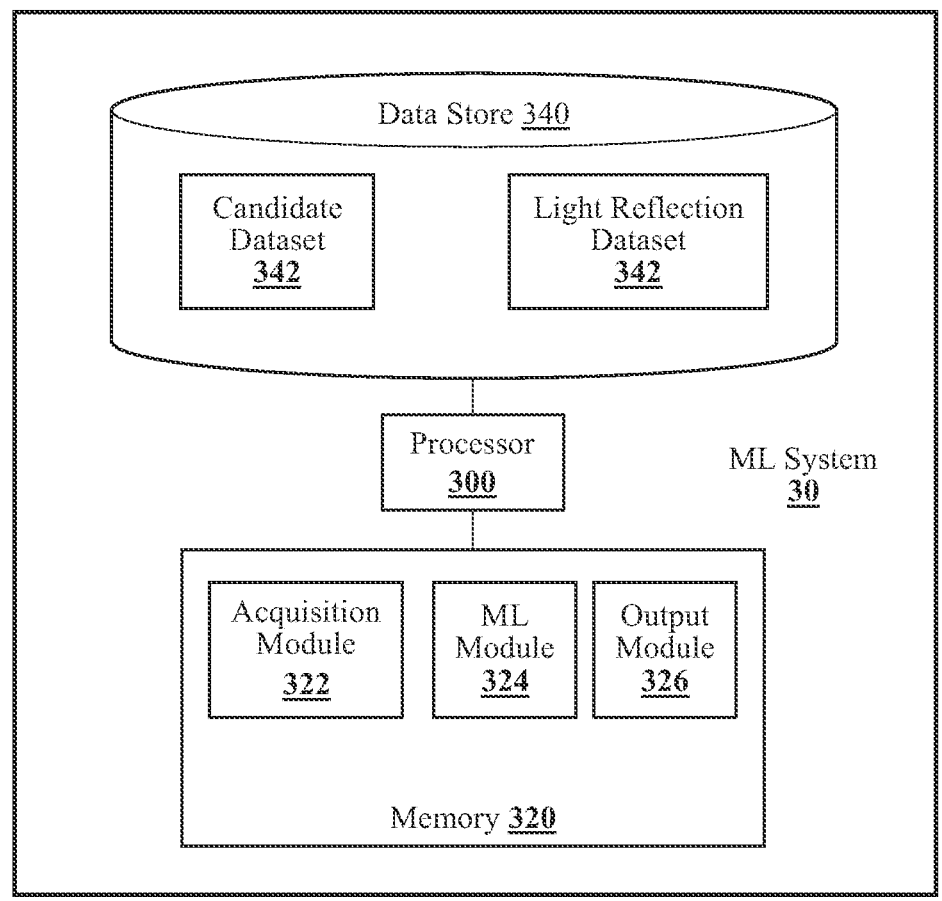
FIG. 9 is a block diagram that illustrates an example of a machine learning system for predicting the presence and/or composition of foreign metallic particles according to the teachings of the present disclosure.

Referring to FIG. 9, in some variations the controller 190, or another controller (not shown) in communication with the controller 190, includes a machine learning (ML) system 30 configured to learn and identify foreign metallic particles. The ML system 30 is shown including one or more processors 300 (referred to herein simply as "processor 300"), a memory 320 and a data store 340 communicably coupled to the processor 300. It should be understood that the processor 300 can be part of the ML system 30, or in the alternative, the ML system 30 can access the processor 100 through a data bus or another communication path.

The memory 320 is configured to store an acquisition module 322, a ML module 324, and in some variations, an output module 326. The memory 320 is a random-access memory (RAM), read-only memory (ROM), a hard-disk drive, a flash memory, or other suitable memory for storing the acquisition module 322, the ML module 324, and the output module 326. Also, the acquisition module 322, ML module 324 and output module 326 are, for example, computer-readable instructions that when executed by the processor 300 cause the processor(s) to perform the various functions disclosed herein.

In some variations the data store 340 is a database, e.g., an electronic data structure stored in the memory 320 or another data store. Also, in at least one variation the data store 340 in the form of a database is configured with routines that can be executed by the processor 300 for analyzing stored data, providing stored data, organizing stored data, and the like. Accordingly, in some variations the data store 340 stores data used by one or more of the acquisition module 322, ML module 324 and output module 326. For example, and as shown in FIG. 9, in at least one variation the data store 340 stores a candidate dataset 342 and a light reflection dataset 344. In some variations the candidate dataset 342 includes a listing of a plurality of metallic particles, including a listing of particle sizes and particle chemical compositions. Also, the light reflection dataset 344 includes percent light reflected as a function of light wavelength, and optionally as a function of particle size, for one or more of the plurality of metallic particles listed in the candidate dataset 342. And in at least one variation, the candidate dataset 342 includes a training dataset with one or more metallic particles tagged with one or more percent light reflected as a function of light wavelength.

The acquisition module 322 can include instructions that function to control the processor 300 to select a metallic particle from the candidate dataset 342 and a corresponding percent reflected light as a function of light wavelength from the light reflection dataset 344. And in at least one variation the acquisition module 322 can include instructions that function to control the processor 300 to provide the selected metallic particle and the corresponding percent reflect light as a function of light wavelength as an input dataset to the ML module 324.

The ML module 324 includes instructions that function to control the processor 300 to train a ML model (algorithm) using the input dataset. In some variations, the ML module 324 includes instructions that function to control the processor 100 to train the ML model unsupervised. In other variations, the ML module 324 includes instructions that function to control the processor 300 to train the ML model supervised using a training dataset with one or more metallic particles with one or more percent reflected light as a function of wavelength. Stated differently, in some variations the input dataset can include one or metallic particles tagged with one or more percent reflected light as a function of light wavelength (e.g., a training dataset) and the ML module 324 trains the ML model to predict the tagged percent reflected light as a function of light wavelength for the one or more metallic particles to within a desired value (i.e., less than or equal to a desired value) of a cost function (also known as a "loss function"). In other variations, the input dataset can include images of foreign metallic particles with or without data on overall light intensity, shape, and position of electrode, among others, and the ML module 324 trains the ML model to predict if a foreign metallic particle is present based on a captured image. And after training of the ML model, the ML module 324 includes instructions that function to control the processor 300 to predict metallic particles, both size and chemical composition, for metallic particles not tagged with the percent reflected light as a function of light wavelength (i.e., not in the training dataset).

Non-limiting examples of the ML model include ML models such as nearest neighbor models, Naïve Bayes models, linear regression models, support vector machine (SVM) models, and neural network models, among others. And in at least one variation the ML model is a Gaussian Process regression model. Also, training of the ML model provides a model that predicts of an optimized material composition with respect to a predefined material property to within a desired value (i.e., less than or equal to a desired value) of a cost function (also known as a loss function).

In operation, the ML system 30 learns the percentage of light reflected from foreign metallic particles having different sizes and/or chemical compositions. In some variations, the ML system 30 learns the percentage of light reflected, overall light intensity, shape, and/or among other characteristics from foreign metallic particles having different sizes and/or chemical compositions of foreign metallic particles as a function of light wavelength, multi-channel light intensity differential measurements, and/or hyperspectral imaging. In addition, the ML system 30 receives signals from the one or more foreign metallic particle detectors 180 and identifies foreign metallic particles, foreign metallic particles sizes, and/or foreign metallic particle chemical composition based on the received signals. The ML system 30

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A metallic particle detector system comprising:
a roll-to-roll coated electrode manufacturing line;
a particle detection unit comprising:
   a visible light source configured to propagate visible light onto an active material layer;
   a detector, with a plurality of pixels, configured to detect, and provide signals as function of, the visible light propagated from the visible light source and reflected from a surface of the active material layer of an electrode strip moving between a section and a subsequent section on the roll-to-roll coated electrode manufacturing line, with magnification of the detector configured to image one foreign metallic particle in one pixel of the plurality of pixels and thereby enhance contribution of visible light reflected from the one foreign metallic particle to an image of the one foreign metallic particle; and
a controller configured to receive the signals from the detector and determine:
   in-situ, and as a function of the signals from the detector, a foreign metallic particle in or on the active material layer; and
   a position of the foreign metallic particle on the electrode strip moving on the roll-to-roll coated electrode manufacturing line.

2. The metallic particle detector system according to claim 1, wherein the detector is selected from the group consisting of a line scanner and sCMOS camera with a rolling shutter.

3. The metallic particle detector system according to claim 2, wherein the detector is the sCMOS camera with the rolling shutter, the sCMOS camera comprising a plurality of pixels, a magnification, and a shutter time such that one foreign metallic particle is imaged with one pixel of the plurality of pixels and the one foreign metallic particle is imaged at least 500 times by the sCMOS camera as the electrode strip is moving between the section and the subsequent section on the electrode manufacturing line.

4. The metallic particle detector system according to claim 1, wherein the visible light source is configured to propagate the visible light onto the active material layer as the electrode strip is moving on the roll-to-roll coated electrode manufacturing line.

5. The metallic particle detector system according to claim 4, wherein the visible light source is selected from the group consisting of a visible laser light source and a visible broadband light source.

6. The metallic particle detector system according to claim 5, wherein the visible light source is the visible laser light source.

7. The metallic particle detector system according to claim 5, wherein the visible light source is the visible broadband light source.

8. The metallic particle detector system according to claim 7 further comprising a light-tight enclosure, wherein the detector and the visible broadband light source are positioned within the light-tight enclosure.

9. The metallic particle detector system according to claim 1, wherein the controller is configured to chemically characterize the foreign metallic particle.

10. The metallic particle detector system according to claim 9, wherein the controller is configured to characterize the foreign metallic particle as a function of reflectance of a predefined light wavelength reflected from the foreign metallic particle.

11. The metallic particle detector system according to claim 10, wherein the controller is configured to characterize at least one of an aluminum particle, a silver particle, a gold particle, a copper particle, and a steel particle.

12. The metallic particle detector system according to claim 1, wherein the controller is configured to receive the signals provided from the detector and determine foreign metallic particles with an average diameter greater than or equal to about 25 µm and less than or equal to 1000 µm.

13. The metallic particle detector system according to claim 1, wherein the detector and controller are configured to be releasably attached to different components of the roll-to-roll coated electrode manufacturing line.

14. The metallic particle detector system according to claim 1 further comprising a programmable logic controller configured to receive a command from the controller and remove a section of the electrode strip with a foreign metallic particle from the roll-to-roll coated electrode manufacturing line.

15. The metallic particle detector system according to claim 14, wherein the particle detection unit is a plurality of particle detection units configured to be releasably attached to different components of the roll-to-roll coated electrode manufacturing line.

16. A metallic particle detector system comprising:
a roll-to-roll coated electrode manufacturing line with an electrode strip moving between a section and a subsequent section;
a visible light source configured to propagate light onto an active material layer of the electrode strip, the visible light source selected from the group consisting of a visible laser light source and a visible broadband light source;
a plurality of particle detection units, the plurality of particle detection units individually comprising a detector, with a plurality pixels, selected from the group consisting of a line scanner and sCMOS camera with a rolling shutter, the detector configured to detect, and provide signals as function of, the visible light propagated from the visible light source and reflected from a surface of the active material layer, and magnification of the detector configured to image one foreign metallic particle in one pixel of the plurality of pixels and thereby enhance contribution of visible light reflected from the one foreign metallic particle to an image of the one foreign metallic particle; and
a controller in communication with the plurality of particle detection units, the controller configured to receive the signals from the individual detectors and determine:
   in-situ, and as a function of the signals from the detector, a foreign metallic particle in or on the active material layer; and
   a position of the foreign metallic particle on the electrode strip moving between the section and the subsequent section on the roll-to-roll coated electrode manufacturing line.

17. The metallic particle detector system according to claim 16 wherein the visible light source is the visible laser light source and the visible laser light source is configured to propagate the visible light onto the active material layer as the electrode strip is moving between the section and the subsequent section on the roll-to-roll coated electrode manufacturing line.

18. The metallic particle detector system according to claim 16 further comprising a programmable logic controller configured to receive a command from the controller and remove a section of the electrode strip with a foreign metallic particle from the roll-to-roll coated electrode manufacturing line.

19. An electrode manufacturing line comprising:
- a roll-to-roll coated electrode manufacturing line with an electrode strip moving between a section and a subsequent section;
- a particle detection unit comprising:
   - a visible light source configured to propagate light onto an active material layer, the visible light source selected from the group consisting of a visible laser light source and a visible broadband light source;
   - a detector, with a plurality pixels, selected from the group consisting of a line scanner and sCMOS camera with a rolling shutter, the detector configured to detect, and provide signals as function of, the visible light propagated from the visible light source and reflected from a surface of an active material layer of the electrode, and magnification of the detector configured to image one foreign metallic particle in one pixel of the plurality of pixels and thereby enhance contribution of visible light reflected from the one foreign metallic particle to an image of the one foreign metallic particle;
- a controller configured to receive the signals from the detector and determine:
   - in-situ, and as a function of the signals from the detector, a foreign metallic particle in or on the active material layer; and
   - a position of the foreign metallic particle on the electrode strip moving between the section and the subsequent section on a roll-to-roll coated electrode manufacturing line; and
- a programmable logic controller configured to receive a command from the controller and remove a section of the electrode strip with a detected foreign metallic particle from the electrode manufacturing line.

* * * * *